(12) United States Patent
Brochez (10) Patent No.: US 7,806,620 B1
(45) Date of Patent: Oct. 5, 2010

(54) CORNER JOINT AND METHOD FOR MAKING THE SAME

(76) Inventor: Alain Brochez, Achiel Van Eechautestraat 4, B-9800 Deinze (BE)

( * ) Notice: Subject to any disclaimer, the term of this patent is extended or adjusted under 35 U.S.C. 154(b) by 0 days.

(21) Appl. No.: 09/806,304

(22) PCT Filed: Sep. 28, 1999

(86) PCT No.: PCT/BE99/00123

§ 371 (c)(1),
(2), (4) Date: Mar. 29, 2001

(87) PCT Pub. No.: WO00/19051

PCT Pub. Date: Apr. 6, 2000

(30) Foreign Application Priority Data

Sep. 29, 1998 (BE) .................................. 9800695
Jan. 21, 1999 (BE) .................................. 9900041

(51) Int. Cl.
*F16B 7/00* (2006.01)
(52) U.S. Cl. ........................................ 403/295; 403/403
(58) Field of Classification Search ......... 403/401–403, 403/382, 295; 52/204.1, 766, 768, 656.9; 92/766, 768, 656.9; 29/513, 521; 70/782
See application file for complete search history.

(56) References Cited

U.S. PATENT DOCUMENTS

| | | | | |
|---|---|---|---|---|
| 2,451,076 A | * | 10/1948 | Edwards, Jr. ................. 403/295 |
| 2,792,918 A | * | 5/1957 | Olsen ........................ 403/295 |
| 2,861,659 A | * | 11/1958 | Hagerty et al. |
| 3,289,341 A | * | 12/1966 | Howell ....................... 403/402 |
| 3,604,739 A | * | 9/1971 | Carlisle |
| 3,606,419 A | * | 9/1971 | Virkler et al. .............. 52/656.9 |
| 3,627,359 A | * | 12/1971 | Paul ....................... 52/656.9 X |
| 3,677,433 A | * | 7/1972 | Collins ................... 403/401 X |
| 3,718,081 A | * | 2/1973 | Root ......................... 454/335 |
| 3,782,054 A | * | 1/1974 | Goss, Jr. ................. 403/401 X |
| 3,797,194 A | * | 3/1974 | Ekstein ....................... 403/295 |
| 3,829,226 A | * | 8/1974 | Kreusel ...................... 403/295 |
| 3,967,910 A | * | 7/1976 | Tollefsrud ................... 403/402 |
| 4,090,799 A | * | 5/1978 | Crotti et al. ................. 403/401 |
| 4,452,138 A | * | 6/1984 | Bubley et al. .......... 403/402 X |
| 4,530,195 A | * | 7/1985 | Leopold ................. 403/401 X |
| 4,637,752 A | * | 1/1987 | Centa |
| 4,651,482 A | * | 3/1987 | Borys |
| 5,154,034 A | * | 10/1992 | Stanek ........................ 52/766 |
| 5,378,077 A | * | 1/1995 | Paulsen ....................... 403/205 |
| 5,433,054 A | * | 7/1995 | Langenhorst ............... 403/402 |
| 5,473,853 A | * | 12/1995 | Guillemet et al. ........... 160/105 |

(Continued)

FOREIGN PATENT DOCUMENTS

DE           932876        *   9/1955

(Continued)

*Primary Examiner*—Victor MacArthur
(74) *Attorney, Agent, or Firm*—Bacon & Thomas, PLLC (57) ABSTRACT

Corner joint, in particular a corner joint (1) for cabinetwork which is made of hollow molds (2-3), whereby this corner joint (1) has at least one infeed corner piece (4) with two infeed parts (5-6) extending at an angle which extend in the respective far ends of the molds (2-3) to be joined, characterized in that it is provided with supplementary features which increase the resistance of this corner joint (1) and thus of the mitre as a whole against deformation.

10 Claims, 5 Drawing Sheets

U.S. PATENT DOCUMENTS 5,485,705 A * 1/1996 Guillemet .................. 160/105
5,564,758 A * 10/1996 Tiberio
5,621,994 A * 4/1997 Cobb et al. ............. 403/401 X
6,108,997 A * 8/2000 Blais et al.

FOREIGN PATENT DOCUMENTS

| | | | |
|---|---|---|---|
| DE | 2146570 A * | 10/1972 | |
| DE | 2300281 A * | 7/1974 | |
| DE | 2307595 A * | 8/1974 | |
| DE | 2315380 A * | 10/1974 | |
| DE | 2500937 A1 * | 7/1976 | |
| DE | 2522523 A * | 12/1976 | |
| DE | 2532890 A1 * | 2/1977 | |
| DE | 3408995 A1 * | 9/1985 | |
| DE | 4303877 A1 * | 8/1994 | |
| DE | 4305377 A1 * | 9/1994 | |
| DE | 19700604 A1 * | 7/1998 | |
| EP | 412669 A1 * | 2/1991 | |
| EP | 0541117 A1 * | 5/1993 | |
| EP | 549554 A1 * | 6/1993 | |
| EP | 563018 A2 * | 9/1993 | |
| EP | 0790087 A1 * | 8/1997 | |
| EP | 835978 A2 * | 4/1998 | |
| FR | 2234062 A * | 2/1975 | |
| FR | 2734599 A1 * | 11/1996 | |
| GB | 2062159 A * | 5/1981 | |
| JP | 08066282 A * | 3/1996 | |
| NL | 7213375 A1 * | 4/1973 | |
| NL | 179629 * | 9/1986 | |
| WO | WO 9115314 A1 * | 10/1991 | |
| WO | WO 2005033459 A2 * | 4/2005 | |

* cited by examiner

CORNER JOINT AND METHOD FOR MAKING THE SAME

BACKGROUND OF THE INVENTION

The present invention concerns a corner joint, a method for making such a corner joint and a corner piece to realise such a corner joint in view of a significative inertia reduction of the side members used for making frames.

In particular, it concerns a corner joint for cabinetwork which is made of hollow side members, whereby this corner joint has at least one insert corner piece with two insert parts extending at an angle which extend in the respective far ends of the side members to be joined.

In the first place, the invention is meant for making a corner joint with metal side members, but in a more general way it can also be used, at least to a certain extent, for making corner joints with side members made of other materials, such as PVC and such.

It is known that corner joints in frames, for example of windows and doors, which are made of hollow side members can be realised by mitre-joining the side members and by connecting them by means of a corner piece. It is also known that such a corner piece can be locked in different mechanical ways in relation to the side members, such as by means of inwardly bent wall parts meshing in recesses in the corner piece, by means of pins or by means of rotating eccentric pivots, etc.

What is important is that the mitres which are obtained in the end are sufficiently rigid, so that when the glass is put in, and also as time passes, the frame as a whole will not hang askew and the side members will not bend, as a result of which the frame would bulge.

It should be noted that up to now, the locking means are only used as locks with the above-mentioned techniques, without actually contributing to the rigidity and prestress of the obtained mitre as a whole. According to the present state of the art, the rigidity is mainly obtained thanks to the rigidity of the material of the corner joining piece in the corner itself. According to a critical, persistent misconception, it is often thought that such rigidity can be obtained by wedging up in a suitable manner, also called fastening by wedges.

The known techniques are disadvantageous in that fatigue in the corner joining piece soon becomes evident in the frame hanging askew and in that the slightest setting occurring after the wedging up also results in a bending of the side members.

SUMMARY OF THE INVENTION

The present invention aims an improved corner joint in general, and a corner joint which excludes the abovementioned disadvantages in particular.

According to special embodiments, it also aims a corner joint which allows for the temporary fluctuation of forces while pressure is being exerted as the whole is pressed together, for the permanent fluctuation of forces as a result of the wedging up of the glass at a later stage, as well as for an optimal expulsion of the hardening locking pastes and/or filling compounds that may be used.

Also, in the first place, the invention concerns a corner joint of the type mentioned in the introduction, characterised in that it is provided with supplementary features which increase the resistance of this corner joint and of the mitre as a whole in particular against deformation, in particular the hanging askew of the frame as a whole and/or the bulging of the respective side members.

As the corner joint is equipped with supplementary features which increase the resistance against any possible hanging askew, the rigidity of the corner no longer solely depends on the rigidity of the corner piece at the height of the corner itself and of the wedging up, which has for a result that the corner joint is less subject to the abovementioned disadvantages and that the quality of the corner joint increases.

The above-mentioned supplementary features can be of different nature according to the invention. On the one hand, these features may consist of means provided on the corner piece and/or the side members, which reinforce the corner as a whole. On the other hand, these features may also consist of means provided on the corner piece and/or the side members, which exclude disadvantageous situations, such as for example disadvantageous effects in case of frost. Further, these features may also consist of a suitable adjustment and/or positioning and/or combination of the different components, such as a result of a number of measures taken according to the invention while the corner joint is manufactured.

The different supplementary features which can be provided to the corner piece itself can be either or not combined in a symbiotic manner.

According to a major preferred combination, the corner joint is characterised in that it is provided with a corner piece with insert parts which represents at least the following combination of characteristics:

that the corner piece has a part on at least one of the insert parts and preferably on both insert parts which extends through the attachment channels of the accompanying side member in an oblique manner as of the accompanying locking means up to the opposite wall of the attachment channels in which the corner piece is situated, whereby this part forms a support up to a place which is situated significantly deeper in the attachment channels than the above-mentioned locking means;

that the insert parts are equipped with inclined parts which are joined together at an angle and which are each connected at their far ends with the above-mentioned accompanying oblique part, such that pressure created in the oblique parts creates a tensile force in the first-mentioned parts;

that the inclined parts which are joined together at an angle are situated against the inner wall of the attachment channels in which the insert parts are provided; and that the insert parts mainly have the shape of an arrow point split in the longitudinal direction, whereby the outer corner is mainly free of any material, possibly to the exception of a number of elastically deformable positioning parts.

For the different embodiments of the invention, we refer to the description in the claims, as well as to the following detailed description.

BRIEF DESCRIPTION OF THE DRAWINGS

The invention also concerns a method for realising the above-mentioned corner joint, whose characteristics will also become clear from the following detailed description.

In order to better explain the characteristics of the invention, the following preferred embodiments of the invention are described as an example only without being limitative in any way, with reference to the accompanying drawings, in which.

DETAILED DESCRIPTION OF THE INVENTION

Figure 4:
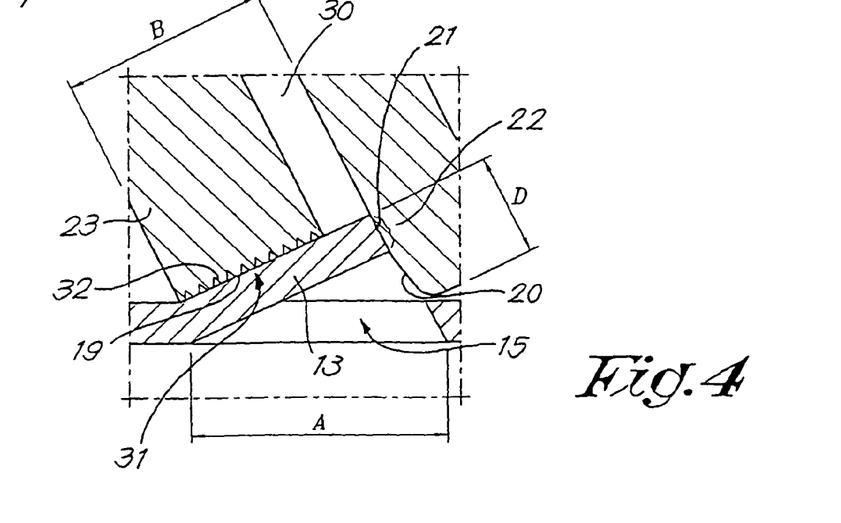
FIGS. 4 and 5 represent a view to a larger scale of the parts indicated by F4 and F5 in FIG. 1.
Figure 5:
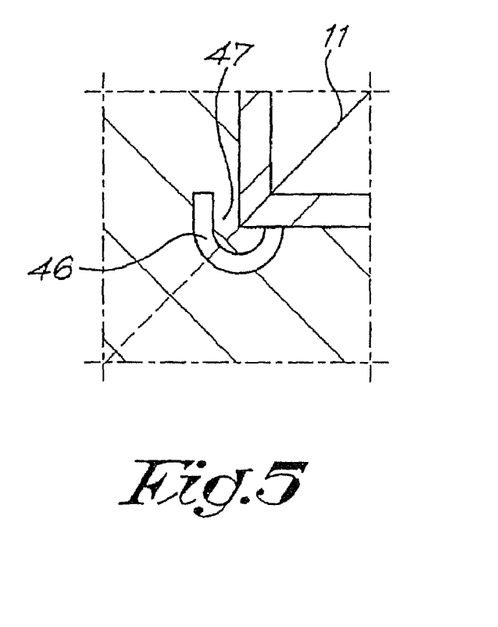
Figure 6:
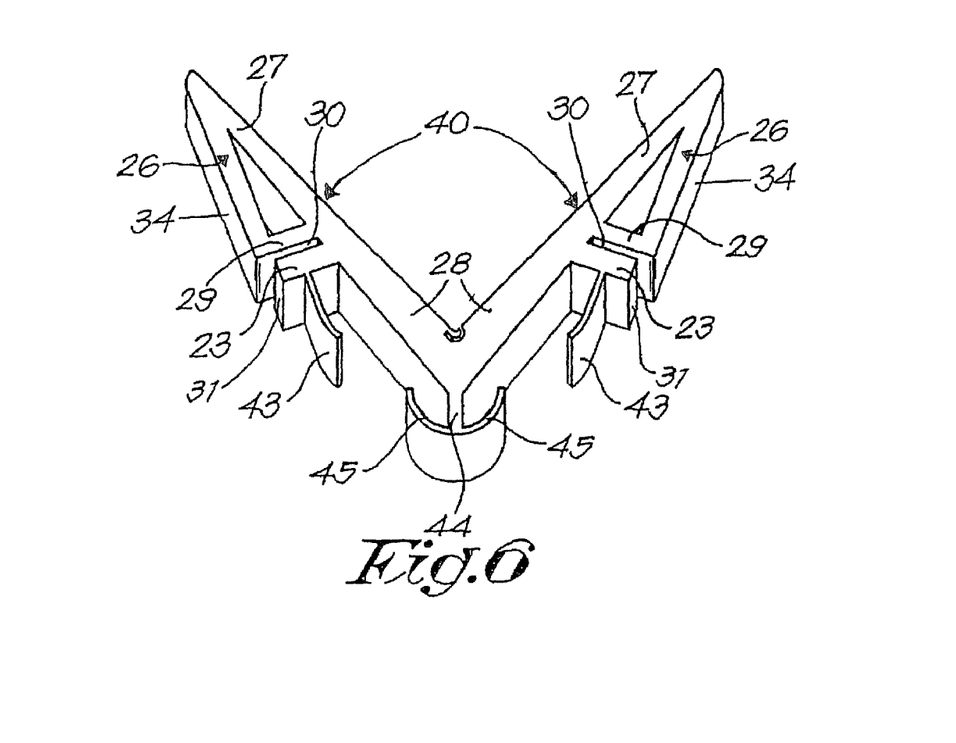
FIG. 6 represents the corner piece from FIG. 1 in perspective.

As represented in FIGS. 1 to 7, the invention concerns a corner joint 1 for connecting hollow side members 2, 3 at a right angle or any other angle whatsoever, whereby the connection is realised by means of a corner piece 4 which is represented more specifically in FIG. 6 and which has two insert parts 5, 6 extending at an angle which are inserted in the respective ends 7, 8 of the side members 2, 3 to be connected, in particular in the attachment channels 9, 10 provided therein.

Figure 1:
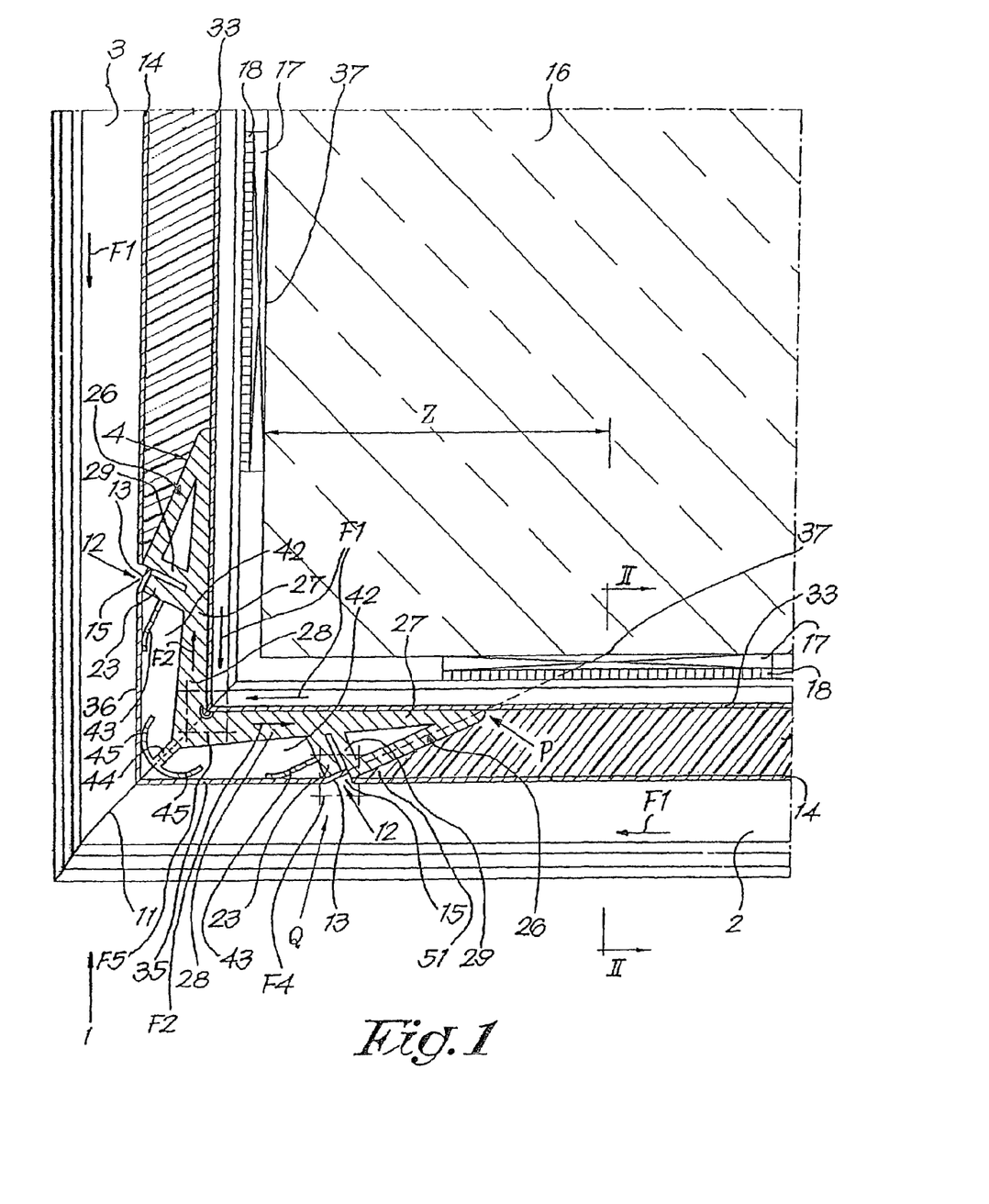
FIG. 1 represents a section of a corner joint according to the invention.

These side members 2 and 3 are hereby mitre-sewn in the known manner, and the aim is that, when they are mounted as represented in FIG. 1, they always fit up perfectly on the mitre joint, and under pre-stress according to the invention.

The mutual interlocking between the corner piece 4 on the one hand and the side members 2, 3 on the other hand is carried out by means of locking means 12 which, in the example from FIGS. 1 to 7, are each time formed of a lip 13 which consists of a pressed-in material part of the outer wall 14 which confines the attachment channels 9, 10 respectively and which is situated in a notch 15. It should be noted that, as will be described further as well, these locking means 12 do not necessarily have to consist of a pressed-in material part, but that they may also be formed in another manner, for example by means of a drive-in pen, a rotating eccentric pin, etc.

In the given example, the corner joint is part of a window in which is provided a pane of glass 16 which is fixed in the window by means of wedges 17. Under the wedges 17 can be provided, as represented in FIG. 1, a protective layer and/or insulation layer 18.

The invention is special in that the corner joint 1 is equipped with a number of supplementary features, as a result of which this corner joint 1 has been optimised in many respects in a symbiotic context; in particular it is more resistant against deformation, not only during the wedging up of the pane of glass 16, but also afterwards.

As will become clear from the following description, different features are combined in the example represented in FIGS. 1 to 7. It should be noted that, although such a combination is preferable, the invention also concerns embodiments in which only one or several of these features are applied.

A first feature consists in that a tensioning force is created at the height of the locking means 12 which not only provides for a locking effect, but which also creates an effective tensile force in the corner, i.e. pressure on both side attachments and tension in the corner piece. Thus, the invention provides for mechanical locking means generating pre-stress.

In the case where these locking means 12 consist of upset material parts, as the represented obliquely pressed-in lips 13, this is preferably realised by upsetting the material part, in this case by compressing the material of the lip 13 from a length A to a shorter length B, as indicated in FIG. 4, having one or, several of the following characteristics:

An upsetting which is close to the maximally admitted upsetting of the material, so as to allow for a safety margin. In order to do so, one only has to adjust the angle of inclination between the sides of the notch 15 indicated by A and B to the deformability limit of the material to be processed.

An upsetting which is nominally sufficiently large so as to set off the usual production tolerances and lacquer thicknesses on the extruded semi-finished products (corner pieces and side members). In order to do so, one only has to increase the upsetting, namely the difference between A and B, in case of larger production tolerances/lacquer thicknesses, reduce them respectively in case of smaller production tolerances.

An upsetting whose useful working force on the total mitre can only be increased (optimised) by enlarging the head of the pressed-in lip. In order to be able to do so, one only has to increase the extrusion thickness of the wall from which the lip originates and/or widen the meshing knives of the moulding machine in which the lip is generated.

A second feature consists in that, in order to be able to press the above-mentioned lips 13 in, use is made of a notch 15 which has one or several and preferably all of the following characteristics:

A notch 15 which is characterised in that it is triangular. Thus can be obtained among others that the side 19 of this triangular notch 15 is situated in the direction of or mainly in the direction of the pressed-in lip 13, whereby the creation of any free spaces between the lip 13 and the side 19 is restricted, as opposed to the known trapezoidal recesses, whereby a relatively large free space remains under the pressed-in lip. The disadvantages of such a large space, such as the fact that water can gather in it which may push the lip outward in case of frost, the fact that there can be no effective pressing and the fact that the lip can easily buckle, are minimised thanks to the use of the triangular notch 15, or even excluded. Moreover, a trapezoidal notch (with a bottom parallel to the wall to be perforated) is also disadvantageous in that the top of the pressed-in lip has to endure all possible insertion forces and is deformed into a point when the utmost material limit is exceeded. Thus, the lip entirely loses the stress transmission on the corner piece.

A notch 15 which is a right-angle triangle, whereby the relation between the side 19 against which the lip is situated and the side 20 over which the free end 22 of the lip 13 is pressed in, just as the relation A/B and just as the acute angle between A and B, is dictated by the compression characteristics of the processed material of the side members cylinder.

A notch 15 which is triangular, whereby the side 19 against which the lip 13 is situated is longer than the side 20 over which the free end 23 of the lip 13 is pressed in.

A notch 15 whereby the above-mentioned side 20, as represented in FIG. 4, has a concave bent and/or buckled shape. This allows for differences resulting from production tolerances and lacquer thicknesses to be compensated for and moreover to realise an efficient press-on. Also, the part 22 which is situated deepest preferably extends in a direction which is rectangular or almost rectangular to the longitudinal direction of the folded lip 13, such that the lip 13 will almost certainly remain in place.

A notch 15 having a depth D in the order of magnitude of 3 to 4 mm.

A third feature includes, in the case of embodiments which are equipped with obliquely pressed-in lips 13, as represented in FIGS. 1 to 7, use is made of stop parts 23 which are situated behind the lips 13 and which allow for an efficient pressing-on with a relatively large force. In this manner it is possible to effectively create tensile forces in the corner joint, as opposed to the known embodiments, where the pressing-in of the lips is confined by stops which only allow for a restricted press-on force.

Moreover, the corner joint 1, in particular the stop parts 23, preferably represent one or several of the following characteristics:

The stop parts 23 extend in the prolongation 24 of the press-on direction F, such that the press-on forces are optimally absorbed.

Over the major part of their girth, the stop parts 23 are detached from the remaining structure of the corner piece 4, such that any possible deformations in the stop part 23 cannot have a negative influence on the aimed maximal force transmissions via the remaining structure of the corner piece 4.

The stop parts 23 are only connected to the rest of the corner piece 4 at their base 25, such that they are almost entirely detached from the surrounding structure.

The corner piece 4 has a framed structure, in other words it does not necessarily have a full structure, but it is built up of legs 26, 29, 28, 29, whereby the stop parts 23 are made thicker than the surrounding parts, in particular the leg 29 of the framed structure, and/or are made equally thick as the total length of the pressed-in lip.

Near every stop part 23 concerned, the insert parts 5, 6 of the corner piece 4 are equipped with a recess 30 arranged for storing any possible material which has been scraped off during the pressing in of the lips 13. Thus is assured that no unwanted material can end up between the stop surfaces 31, which form the side 19 of the above-mentioned triangle, and the lips 13. As is represented in the figures, this recess 30 consists of a groove which also makes sure that the stop parts 23 are detached from the rest of the structure over practically their entire girth.

Every stop part 23 concerned is carried out in relief, preferably in the shape of a serration 32. The stop surface 31 which is carried out in relief offers the advantage that a better bond is obtained for locking pastes and that the material on the stop surface 31 can be somewhat flattened, so that large pressure movement or angular divergence during the pressing can be compensated for without damaging the corner joint 1.

The stop parts 23 have such a shape that the formation of attachment channels, to the exception of any possible small attachment channels formed by the serration 32, under the pressed-in lips 13 is restricted and preferably excluded for the above-mentioned reasons.

Every stop part 23 concerned has a stop surface 31 which is inclined, equivalent to the inclination of the pressed-in lip 13.

The basis 25 of every stop part 23 concerned is directly supported by the inner wall 33 confining the above-mentioned attachment channels 9, 10 respectively.

A fourth feature is that the corner piece 4 is equipped with an inclined part 34 defining a pressure zone between the locking means 12 on the one hand, i.e. the lips 13 in the example represented in FIG. 1, and a place P on the wall 33 which is situated deeper in the attachment channels 9, 10 respectively on the other hand, such that there can be a pressure increase between the above 3 mentioned place P and the place Q of the locking means 12. As a result of this pressure increase, there will also be a pressure force in the parts 35 and 36 of the outer walls 14 between the locking means 12 and the corner point, so that these parts are pressed against one another with a force F1.

The inclined parts 34 are in this case a fragment of the above-mentioned legs 26. By making use of legs, i.e. material parts which are detached from the environment, apart from a number of local connections, for example at their far ends, the transition of the pressure force is not influenced by the environment.

When the corner joint 1 as represented in FIG. 1 is part of a frame, of a window or a door, in which a panel, in particular a pane of glass 16, is provided by wedging it up by means of wedges 17, the latter will be situated in the prolongation of the above-mentioned part 34 according to the invention, preferably with their centre. In particular, the intersection 37 between the edge of the pane of glass 16 and the theoretical line 38 will be situated in the middle of the wedges 17.

Glass and window manufacturers recommend to wedge the glass up on the corners at $\frac{1}{10}$ of the height or width of the pane of glass 16 respectively. In practice, however, the wedges 17 are usually situated with their centre at about 10 cm of the inner corner. According to a practical embodiment, the above-mentioned part 34 will then preferably also be directed such that when it is used, the above-mentioned intersection 37 will be situated more or less at a distance Z from the corner of the pane of glass 16 which is in the order of magnitude of 10 cm.

According to the practical embodiment of the invention, the lips 13 are pressed-in in such an oblique manner that at least one of the following characteristics is met:

Every lip 13 concerned is pressed-in such that the free end 21 is situated behind the central axis 39 of the inclined part 34, and better still such that the above-mentioned line 38 is situated on the inside of the central axis 39. As most of the material of the inclined part 34 is thus situated on the outside of the line 38, the inclined part 34 will bulge outward under a pressure load, and the side against which the lip 13 is pressed will obtain an inward inclination which partly prevents the lip 13 from protruding outward.

Every lip 13 concerned has a direction which is bent slightly inward in relation to the direction of the inclined part 34, in particular in relation to the pressure line, as a result of which the lip 13 is also prevented from protruding outward in case of a pressure increase.

In the given example, the inclined part 34 is made in the shape of a leg 26 which is part of a triangle whose second leg 27 extends against the inner wall 33, whose first leg 26 forms an apex with the second leg 27 and extends at an oblique angle relative to the second leg 27 in a direction proximal to the corner portion, as shown in FIGS. 1, 3, 6, 7, and whose third leg 29 extends obliquely from the second leg 27, as shown in FIGS. 1, 3, 6, 7, and forms a link between the first-mentioned leg 26 and the second mentioned leg 27, as a result of which the position of the leg 26 is always stable.

A fifth supplementary feature consists in that the insert parts 5, 6 are equipped with resilient members 40 which are connected to one another at an angle and in that the corner joint 1 has means which make it possible to create a tensile force in these resilient members 40. In the given example of FIGS. 1 to 6, these parts 5, 6 consist of a second leg 27 and a connecting leg 28 extending therefrom, in other words, the resilient member 40 includes the second leg 27 and a connecting leg 28 situated in an extension of the second leg. These resilient members 40 integrally provide reactive tensile force to the compression force which occurs in both side members ends, found both on the inner mitre side and on the outer mitre side of the mould cylinders and which have been created by pushing off both side members on the notch of the insert corner. Under a mitre load resulting from the wedging up of the glass, these resilient members 40 of the insert corner which have been moved as close as possible to the inner mitre side prevent the inner mitre joint from ripping open, partly helped by the thus created increase of pressure forces on the side members cylinders on the outside of the mitre.

The tensile forces F2 indicated in the resilient members 40 in FIG. 1 thus result in pressure forces F1 both in the outer walls 33 as in the inner walls 14.

In the example, the means for creating a tensile force consist of the inclined parts 34 which are respectively linked to the accompanying free end of the resilient members 40. The above-mentioned pressure in the parts 34 thus results in a tension in the resilient members.

Preferably, the above-mentioned resilient members are situated against the inner wall 33 of the respective attachment channels 9, 10, such that the tensile force is optimally transmitted to the inside corner.

Figure 2:
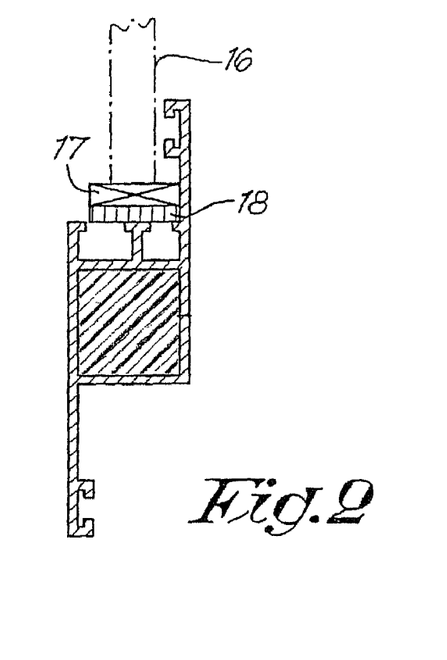
FIG. 2 represents a section to a larger scale according to line II-II in FIG. 1.
Figure 3:
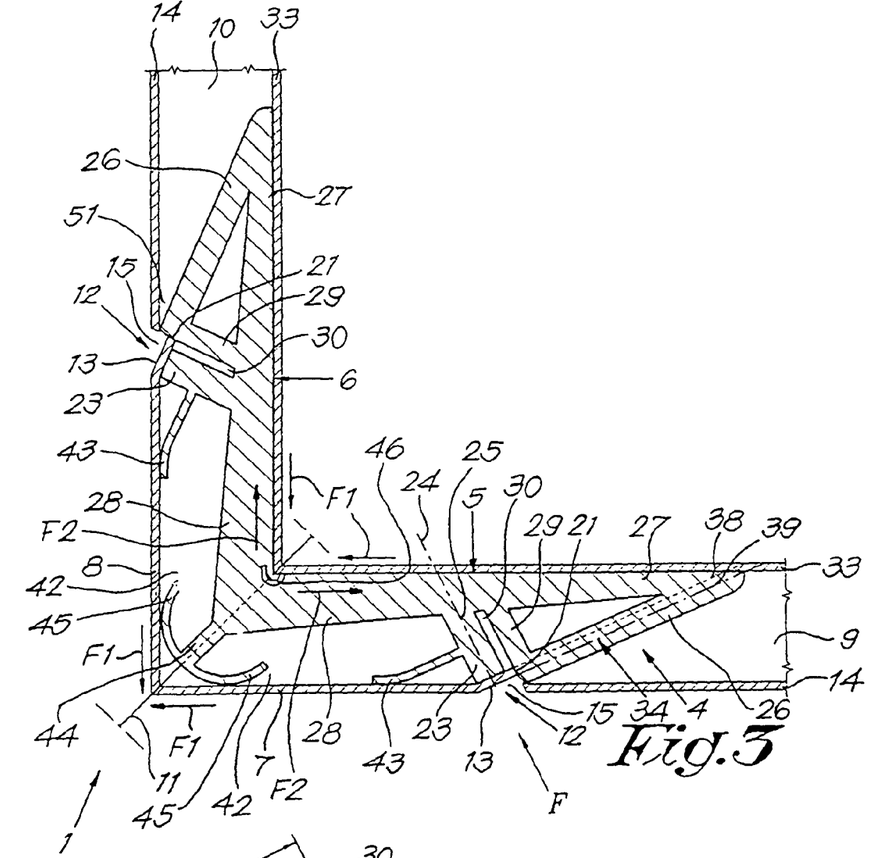
FIG. 3 represents the central part from FIG. 1 to a larger scale with the filling compound removed for the sake of clarity.
Figure 8:
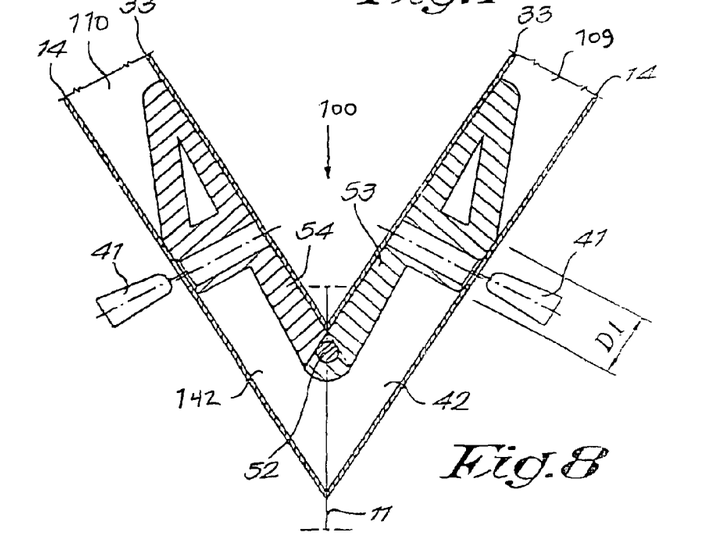
FIGS. 8 and 9 represent variants, whereby a similar corner piece is used in two different applications.
Figure 9:
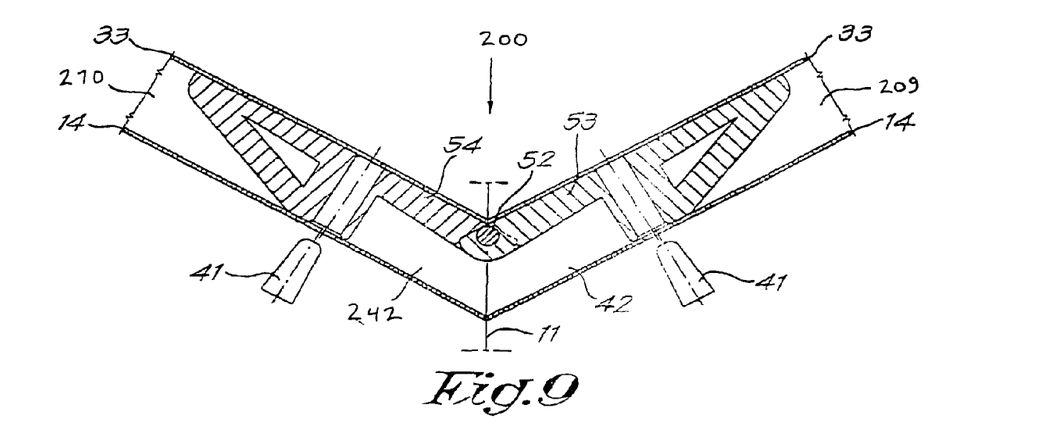

A sixth feature is that the corner joint 1 is mainly free of parallel surfaces between the insert corner piece 4 and the outer walls 14 which confine the attachment channels 9, 10, to the exception of possible zones in which locking means are mounted. As is shown in FIGS. 1 and 2, this implies that there are no essential contact surfaces between the outer walls 14 and the insert corner piece 4 which might freeze open. It should be noted, however, that in the case where for example drive-in pens 41 are used, as represented in FIGS. 8 and 9, there may be a restricted parallel contact over a distance D1 formed by the zone which is required for mounting this sort of locking means.

A seventh feature is that a free space 42 is provided at least on the outside corner of the insert corner piece 4, in particular a space or clearance 42 which is free of massive material, such that any compression or ripping open of the material of the tension zones which is thus weakened and thinner in the connecting corner could occur during the pressing in the moulding machine so as to compensate for possible extrusion tolerances on the rectangular shape of both resilient members 40.

An eighth feature is that the insert corner piece 4 is provided with positioning elements to force said insert corner piece 4 in the right position as they are provided in the attachment channels 9, 10. In the given example, these positioning elements consist of elastically bendable flaps 43 on the one hand which are provided on the insert parts 5, 6 at a distance from the angular point and which co-operate with the outer wall 14, and of supporting and guiding elements on the angular point itself on the other hand, preferably in the shape of a little leg 44 provided with elastically bendable flaps 45 which cooperate with the outer wall 34 respectively, as represented.

It should be noted that such positioning elements according to the invention can also be made in other manners. Thus, they may for example consist of several elastic press-on means which push the insert parts 5, 6 with their inside towards the inner wall 33. These press-on means may be part of the insert corner piece 4 as well as of the wall 14, or they may also consist of loose elements which are provided between the insert corner piece 4 and the wall 14. Instead of elastically bendable flaps 43, also spiral springs can be used, elastically compressible masses such as rubber, etc.

Another feature consists of a space 46 provided in the material of the corner piece 4, right behind the inside corner, without the material of the inside corner having been removed, however, which space makes it possible to push away any burrs which may be present or the side members 2 or 3.

As is represented in detail in FIG. 5, this space 46 can be made such that there remains a hook-shaped material part 47 which can be easily bent. As material remains present in the corner itself, a correct positioning up into the corner is initially possible.

It should be noted that, in former days, the inside corner was always provided with a groove in the extension of the mitre joint, which is disadvantageous in that the sharp inside mitre side of the first side members in which the corner piece 4 was provided, always extended too far this groove. Thanks to the embodiment as described above, this disadvantage is excluded such that the hook-shaped material part 47 offers enough resistance for a correct manual joining of the side members 2 and 3, but it gives in under the large pressure as the whole is pressed and it bends away if there are any sawing burrs.

Further, a number of measures are preferably taken according to the invention while the corner joint is being manufactured, which contribute to the correct formation of the corner and thus also to its rigidity. This will be explained hereafter, with reference to the accompanying FIG. 7 in which the pressing knives 48 for forming and pressing in the lips 13 are represented, as well as a counter block 49.

Since the introduction of the thermal interruption, there has been an additional problem related to the total side members section retaining its shape. Under the influence of the different forces which are exerted on the side members 2, 3, the thermal interruption, which usually has a rectangular shape when seen as a cross section, may start to deform, for example into a shape having the section of a parallelogram.

That is why the side members 2, 3 according to the invention will preferably be forced first to assume their correct section at the height of their future saw cut. This 'forcing' takes place by providing for example supporting blocks around, or at least partially around the side members 2, 3, which blocks have a seating for the side members 2, 3 which follow the theoretically perfect design of the side members 2, 3. Also, the press-on elements, in particular press-on pistons, of the clamping device with which the side members 2, 3 are held in the sawing machine can possibly be provided with a seating which coincides with the pattern of the side members 2, 3.

Figure 7:
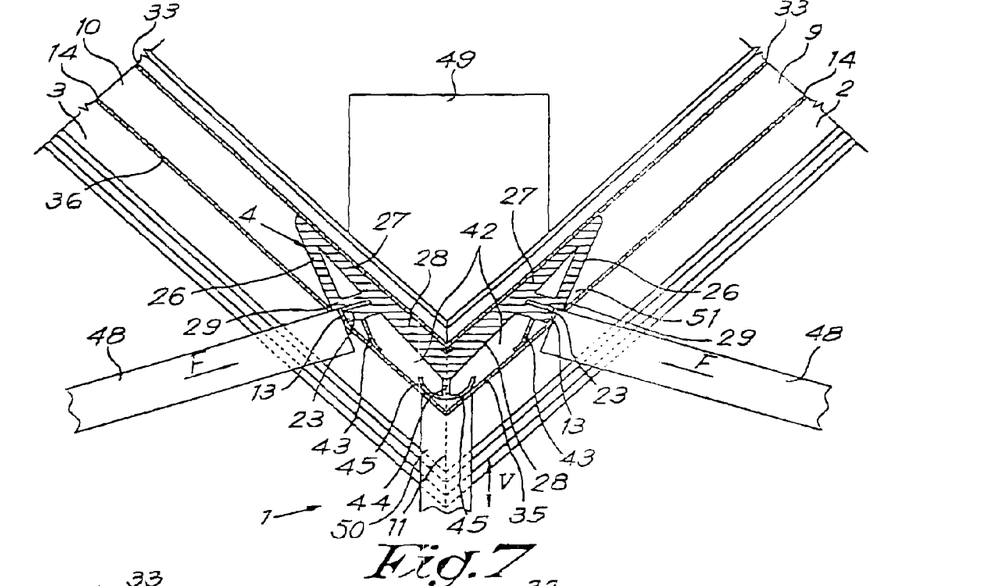
FIG. 7 represents the corner joint from FIG. 1 while being manufactured in the moulding machine.

Also during the actual pressing, as represented in FIG. 7, a number of special measures are preferably taken according to the invention.

First, a positioning is provided for by means of an adjusting fork 50. This adjusting fork 50 can be moved in a direction V in relation to the pressing knives 48, such that the corner formed by the side members 2 and 3 can be situated more or less deep between the pressing knives 48. The adjusting fork 50 is hereby set such that the short sides 20 of the notches 15 end up in the extension of the pressing knives 48. Depending on the thickness of the wall of the side members 2, 3 and the counterpressure of the counter block 49, the initially set distance will have to be lengthened or shortened somewhat by feel.

Usually, a few simple tests on dry-made test mitres, by which we mean that no locking pastes or such are used, will do in order to be able to process a specific series of side members over a longer period. A good valuation can be made on the basis of the following two tests:

By trying to push open the corner formed by the side members 2, 3. If the mitre joint 11 stays together, the corner joint is okay.

By checking the short side 20. When it is somewhat scraped off after the pressing, this indicates that the corner joint 1 is sufficiently rigid.

For the counterblock 49 is preferably also used a block with a seating whose shape is adjusted to the shape of the side members, such that the side members 2, 3 are also forced to keep assuming their correct form during the pressing.

As far as the section and corner of the pressing knives 48 are concerned, it should be noted that wider lips 13 are to be preferred over narrow lips 13, whereas the angle of inclination is preferably selected on the basis of the elastic qualities of the material of the side members attachment channel.

The stroke back and forth of the pressing knives 48 is preferably adjusted such that the end point of the movement is situated such that, during the pressing, the mitre as a whole rebounds slightly on the counterblock 49. Then one can be sure that the bottom of the lips 13 is pressed perfectly against the stop surface 31 concerned.

Depending on the destination of the windows, the corner joints 1 will be protected in one or several places by means of a protective compound, paste, or such.

This protective compound may consist of a filler, for example polyurethane or glue, whereby this glue is essential, not as far as rigidity is concerned, but as far as sealing and bearing is concerned.

According to a first possibility, a filling compound may be provided beforehand in the above-mentioned notches 15 before shifting the insert corner piece 4 in the attachment channels 9, 10. Depending on the amount used, this filling compound offers one or several advantages. In the case of a small amount, possible cavities under lips 13 will be filled, so that no water can gather underneath it which might push the lips 13 outward in case of frost. If a somewhat larger amount is used, at least a part of the filler is driven out from under the lips 13 during the pressing and forced towards the sides thereof, so that the passages around the lips 13 are closed off, such that no water can penetrate in the side members 2, 3.

In case an even higher degree of protection is s required, a filling compound will be preferably provided on top of the pressed-in lips 13 which is skimmed off evenly with the outer side of the side members. In this manner, the notches 15 are entirely filled, so that also the unprotected aluminium around the lips 13 is protected against oxidation. This filling up is particularly appropriate for windows which are placed in relatively aggressive environments, such as coastal areas and industrial areas.

According to yet another possibility, a filler can also be provided in the attachment channels 9, 10, prior to the placing of the insert corner piece 4. Thanks to the smooth, arrow-shaped design of the insert parts 5 and 6, said filler will be optimally driven out to the most appropriate location, as indicated by reference 51 in FIG. 1. This technique makes it possible to partly relieve the lips 13, as the pressure transfer surface is enlarged. This is particularly appropriate for larger windows and heavy panes of glass.

Further, it is possible to apply a protective means with a very fine molecular structure on the mitre joint 11 itself for joining together the side members 2 and 3, such that the mitre joint, in case the reveal surfaces of both side members are not situated in a plane due to extrusion tolerances, are protected against oxidation.

The side members 2, 3 are themselves provided with a protective layer, such as lacquer or a layer off synthetic material, but it is clear that there is no such layer on the saw cut itself.

It is clear that this saw cut/oxidation coating may not contain any solvents which might affect the lacquer. Moreover, this oxidation coating has a structure which is fine enough in order to avoid that the product is driven entirely out or the mitre joint 11 under the pressure of both mould cylinders.

It should be noted that the invention is not restricted to corner pieces 4 with insert parts 5, 6 which are fixed to one another, but that, according to a variant, these insert parts may also be adjusted at an angle. An example thereof is represented in FIGS. 8 to 10.

The insert parts 5 and 6 are hereby hinge-mounted to one another by means of a pivot 52. To this end, the ends of these insert parts 5 and 6 which are directed to one another are each provided with a hook-shaped part 53, 54, with seatings 55, 56 in which the pivot 52 is provided in a loose manner.

Figure 11:
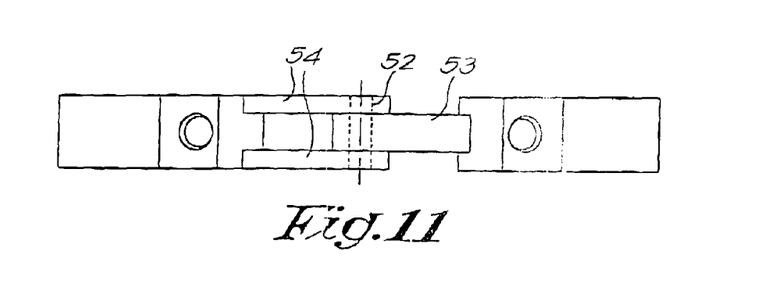
FIG. 11 shows a view according to arrow F11 in FIG. 10, whereby the parts of the corner piece are connected to one another.

The one hook-shaped part 54 is made in the shape of a fork, as can be seen in FIG. 11, in between which the other hook-shaped part 53 is placed.

Figure 10:
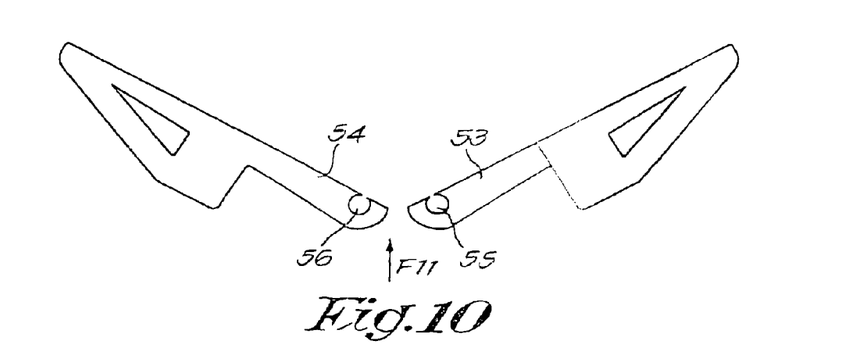
FIG. 10 represents the corner piece from FIGS. 8 and 9 as dismounted.

It should be noted that the corner pieces 4, both in the embodiment of FIGS. 1 to 7 and in the embodiment of FIGS. 8 to 10 preferably consist of extruded frame member, in particular pieces which are made by cutting off parts of an extruded mould and which are finished if necessary.

The corner piece 4 of FIGS. 8 to 10 also differs from the one in FIG. 1 in that, instead of inwardly bent lips 13, use is made of conical drive-in pens 41 which are driven in. It is clear, however, that practically all other characteristics of the embodiment of FIGS. 1 to 7 also apply in this case.

Thus, for example, in the case of conical drive-in pens, the recess 30 which loosens the material can be replaced by placing the openings as little central as possible, i.e. the openings in which the drive-in pens are provided in the direction of the top of the mitre as a whole, so that even here no material can be found anymore which could hinder the pressing-on of the top of the arrow point to the inside of the mitre.

It is clear that also other locking means than the lips 13 or the drive-in pens 41 can be applied while still remaining within the scope of the invention.

It should be noted that when several corner pieces are used which are to be pressed simultaneously (for example thermally interrupted side members having several chambers in which such corner pieces can be placed), it is utterly important that at least the design of the notches themselves is identical for the simultaneously carried out pressing to have the same optimal effect on the different corner pieces.

The present invention is by no means limited to the above described embodiments represented in the accompanying drawings; on the contrary, such a corner joint, the insert corner piece used therefor and the above-mentioned method can be made in all sorts of variants while still remaining within the scope of the invention.

The invention claimed is:

1. A corner joint comprising two frame side members having attachment channels and mitered end portions, and at least one corner piece having two insert parts joined at connecting ends and positioned relative to one another at a predetermined angle, each insert part configured to be received by the mitered end portions of a respective one of the attachment channels of the side members, the attachment channels being confined by an inner wall and an outer wall, wherein a mutual interlocking between the corner piece and the frame side members is carried out by lips defined by a pressed-in material part of the outer wall, which said lips cooperate with notches defined on the corner piece;
wherein each insert part includes at least one said notch comprising a triangular shape defined by a first side against which the lip is positioned which is longer than a second side over which a free end of the lip is pressed in;
wherein the lips generate a pre-stress in the form of pressure on both frame side members and tension in the corner piece, the material of the lips being compressed from a first length to a second length, which is shorter than the first length; and
wherein a compression force has been created in each of the frame side members ends by pushing off both frame side members respectively on the lips;
the corner piece comprising inclined parts defining a pressure zone between the lips and a place on the inner wall which is situated deeper in the attachment channels than the lips to provide a pressure between said place and the lips;
each insert part being equipped with a resilient member, which resilient members are connected to one another at an angle; and
the inclined parts being respectively connected to free ends of the resilient members;
wherein a free space or clearance free of material is provided on an outside corner of the corner piece, the free space or clearance extending from the lips to at least the connecting end of the insert parts;
wherein the inclined parts create tensile forces in the resilient members, since a pressure in the inclined parts results in a tension in the resilient members;
the tensile forces in the resilient members resulting in pressure forces in the outer and inner walls, thus contributing to rigidity and the pre-stress of the corner joint as a whole;
wherein the resilient members are positioned generally along and in contact with the inner wall of the respective attachment channel.

2. The corner joint according to claim 1, wherein the second side extends substantially perpendicular to the longitudinal direction of the lip.

3. The corner joint according to claim 2, wherein said second side of the at least one notch, over which the free end of the lip projection is pressed in, has a bent shape.

4. The corner joint according to claim 1 wherein stop-parts are situated behind the pressed-in lips, the stop parts include serrations.

5. The corner joint according to claim 1, wherein each of said insert parts includes an end portion geometrically configured in the shape of a triangle having an apex directed along a longitudinal axis of the respective attachment channel, each insert part defining a second leg arranged to be urged against the inner wall of the respective attachment channel, a first leg connecting at a first end with a first end of the second leg to form the apex and extending at an oblique angle relative to the second leg in a direction generally proximal to the corner portion, and a third leg extending obliquely relative to the second leg in a direction generally proximal to the corner portion and connecting to the second leg.

6. The corner joint according to claim 5, wherein each inclined part is a fragment of the first leg of the corresponding insert part.

7. The corner joint according to claim 6, wherein the corner joint further comprises a panel being wedged up by wedges, wherein the middle of the wedges is situated in an imaginary prolongation of the inclined parts.

8. The corner joint according to claim 5, wherein each of the insert parts includes the resilient member comprising said second leg and a connecting leg situated in an extension of said second leg for connecting the end portions with the connecting ends of the insert parts; the end portion and the resilient member of each of said insert parts connected to one another at an angle so that the resilient members provide a reactive tensile force to the compression force which occurs in the frame side members ends and which have been created by pushing off both frame side members on the notch of the corner piece.

9. The corner joint according to any one of the preceding claims, wherein the corner piece is provided with positioning elements arranged to guide the insert parts into the attachment channels; and,
wherein the positioning elements include at least one of the following elements;
elastic press-on elements provided on the corner piece to push inner sides of the insert parts against an inner wall of the respective attachment channel;
elastically bendable flaps provided on the insert parts at a predetermined distance from the connecting ends thereof and arranged to cooperate with the outer wall of the respective attachment channel;
guiding elements provided on the corner piece in the shape of a little leg having elastically bendable flaps on the corner piece arranged to cooperate with the outer wall of the respective attachment channel.

10. The joint according to claim 9, wherein the corner piece includes a clearance generally defined at an inside corner where the insert parts connect and having a hook shaped profile.

* * * * *